United States Patent
Montemurro

(10) Patent No.: US 9,026,604 B2
(45) Date of Patent: May 5, 2015

(54) SYSTEM AND METHOD FOR IDENTIFYING A REPLACEMENT ADMINISTRATOR FOR A COMMUNICATION NETWORK

(75) Inventor: Michael Peter Montemurro, Toronto (CA)

(73) Assignee: Blackberry Limited, Waterloo, ON ( * ) Notice: Subject to any disclaimer, the term of this patent is extended or adjusted under 35 U.S.C. 154(b) by 295 days.

(21) Appl. No.: 13/525,585

(22) Filed: Jun. 18, 2012

(65) Prior Publication Data

US 2013/0339504 A1    Dec. 19, 2013

(51) Int. Cl.
G06F 15/16 (2006.01)
H04L 29/08 (2006.01)
H04W 84/20 (2009.01)

(52) U.S. Cl.
CPC ........... *H04L 67/1051* (2013.01); *H04W 84/20* (2013.01)

(58) Field of Classification Search
CPC ............................ H04L 67/1051; H04W 84/20
USPC .................................................. 709/208–209
See application file for complete search history.

(56) References Cited

U.S. PATENT DOCUMENTS

| 2005/0135236 A1 | 6/2005 | Benson |
| 2008/0222294 A1 | 9/2008 | Liang |
| 2009/0274129 A1 | 11/2009 | Ponnuswamy |
| 2010/0165896 A1 | 7/2010 | Gong |
| 2010/0195548 A1 | 8/2010 | Navda |
| 2011/0026504 A1* | 2/2011 | Feinberg ........................ 370/338 |
| 2011/0090829 A1 | 4/2011 | Wu |
| 2011/0176417 A1 | 7/2011 | Kuwabara |
| 2011/0225305 A1* | 9/2011 | Vedantham et al. .......... 709/227 |
| 2012/0076069 A1 | 3/2012 | Ogura |
| 2012/0224569 A1* | 9/2012 | Kubota ......................... 370/338 |
| 2012/0233266 A1* | 9/2012 | Hassan et al. ................. 709/206 |

FOREIGN PATENT DOCUMENTS

EP    1187023 A1    3/2002

OTHER PUBLICATIONS

Unknown Author, Wi-Fi Peer-to-Peer (P2P) Technical Specification, Version 1.1, 2010, Wi-Fi Alliance.

* cited by examiner

*Primary Examiner* — Lance L Barry
(74) *Attorney, Agent, or Firm* — Perry + Currier Inc.

(57) ABSTRACT

The disclosure recites a system and method for identifying an access point for a network. The method comprises: upon a trigger condition for the network assessing intents of members of the network to be an administrator for the network to replace a current administrator for the network; identifying a replacement administrator from the members from the intents of the members; and transferring network management functions from the current administrator to the replacement administrator.

18 Claims, 7 Drawing Sheets

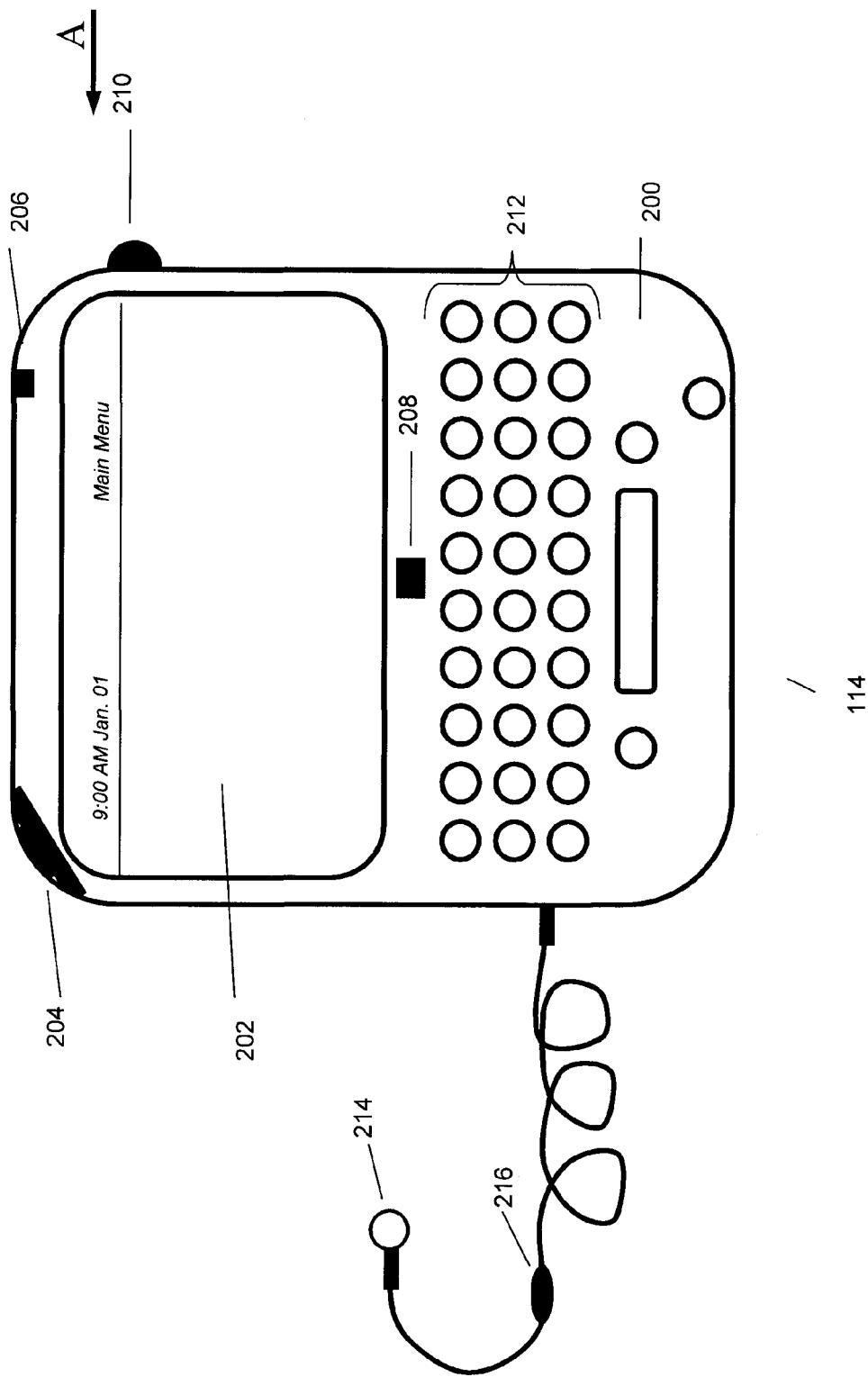

SYSTEM AND METHOD FOR IDENTIFYING A REPLACEMENT ADMINISTRATOR FOR A COMMUNICATION NETWORK

FIELD OF DISCLOSURE

The disclosure provided herein describes generally a system and method for identifying an administrator for a communication network. In particular, an embodiment identifies an access point as the administrator for the network from available candidates and also determines when, and if, a change to the administrator is warranted.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

A typical wireless network utilizes communication hubs to manage communications within communicate the network. A hub provides an access point to the network. The hub may be wireless or wired. Management of access to the wireless network may be controlled through the hub. Once an access point device is identified, it does not change for the network. As such, the access point device takes on a dedicated burden in processing and communication bandwidth and related power drains for managing communications for the network.

BRIEF DESCRIPTION OF THE DRAWINGS

Embodiments of the disclosure will now be described, by way of example only, with reference to the accompanying drawings, in which:

FIG. 2 is a schematic representation of the wireless access point device of FIG. 1B according to an embodiment;

DESCRIPTION OF EMBODIMENTS

Figure 1A:
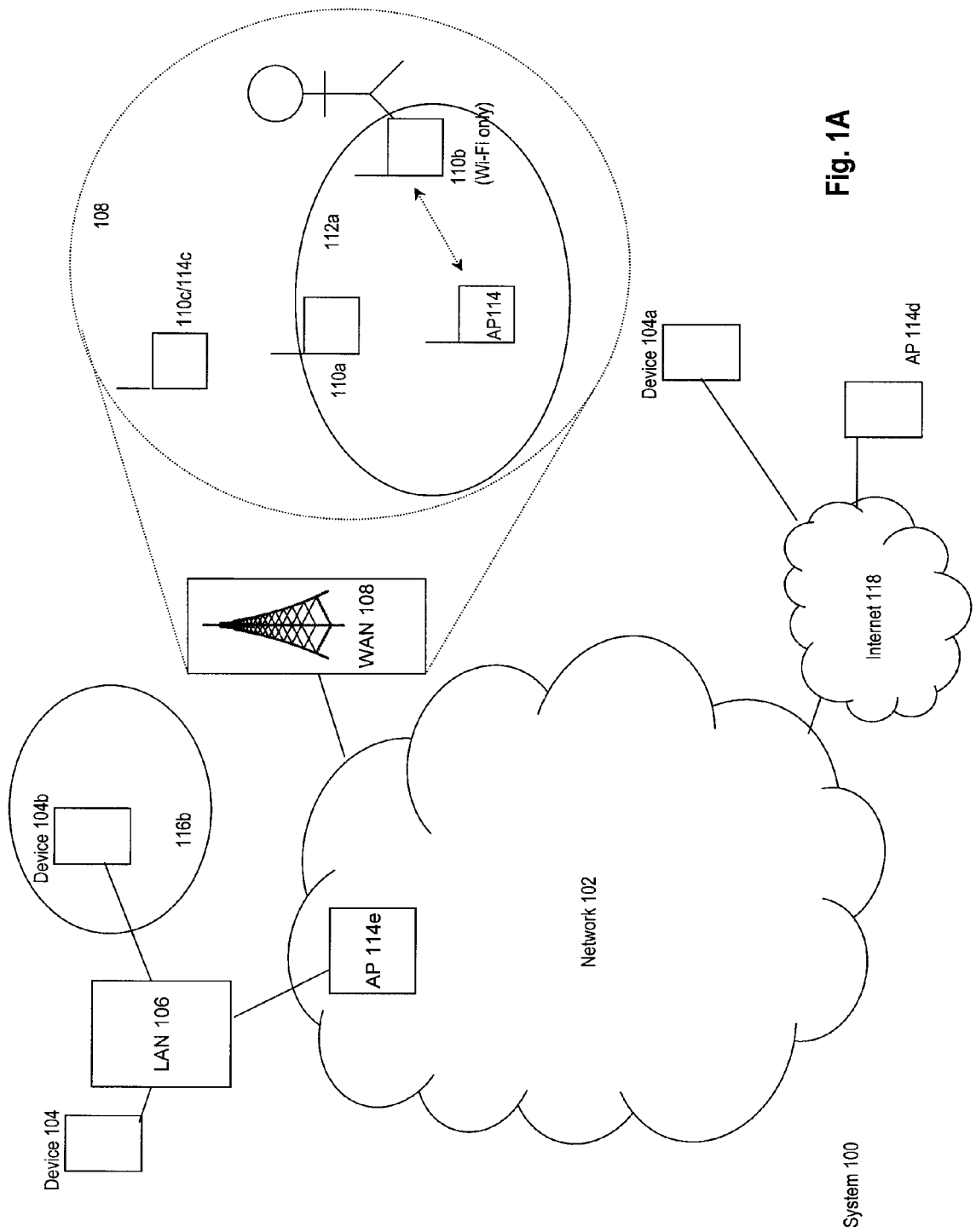
FIG. 1A is a schematic diagram of system having a wireless communication network and a wireless access point communicating with a wireless electronic communication device according to an embodiment.

Exemplary details of embodiments are provided herein. The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Generally, an embodiment provides a system and method for identifying an access point in a network, where the access point is the administrator for the network. One embodiment provides identifies a first device an access point for a network. Thereafter, upon certain conditions, the embodiment identifies another device in the network as a replacement access point, taking over network management responsibilities (in whole or in part) of the first device.

In a first aspect, a method of identifying an access point for a network is provided. The method comprises upon detection of a trigger condition for the network: assessing intents of members of the network to be an administrator for the network to replace a current administrator for the network; identifying a replacement administrator from the members from the intents of the members; and transferring network management functions from the current administrator to the replacement administrator.

In the method, the network may be an 802.11 peer-to-peer (P2P) class network; the current administrator may be a current access point for the network; and the intents of the members of the network may be provided in intent fields in frames transmitted by the members to the network.

In the method, the trigger condition may be any one or more of a battery level of the current administrator; an elapsed time since a second member in the network has been the current access point.

The method may further comprise changing an intent value for the current administrator to a lower level to lessen likelihood that the current administrator will be identified as the replacement administrator.

In the method, upon detection of the trigger condition, the current administrator may execute at least one of the following functions: stop sending beacon frames to the network to force the members in the network to cease network activities; send a broadcast or unicast frames to the members in the network indicating that the current administrator wishes to initiate a group owner negotiation; and/or select a member from the members in the network and sends a frame to initiate a group ownership transition to the member.

The method may further comprise when the network management functions are transferred to the replacement administrator, utilizing network configuration data for the network accessed by the current administrator to configure the network.

The method may further comprise when the network management functions are transferred to the replacement administrator, establishing a replacement network for the network with the replacement administrator providing administrative functions for the replacement network.

The method may further comprise when the network management functions are transferred to the replacement administrator, maintaining the network with the replacement administrator providing administrative functions for the network.

In the method, the replacement network may utilize network configuration data for the network accessed by the current administrator to configure the replacement network.

In the method, a broadcast frame generated by the current administrator may provide a field containing data for the trigger condition.

In the method, the field in the broadcast frame may contain a timer value that indicates when the replacement administrator is to be sought for the network.

In the method, the field in the broadcast frame may contain a count value that indicates a maximum number of beacon signals to be sent by the current administrator before a determination of the replacement administrator is to begin.

In a second aspect, a communication device in a network for communicating with other communication devices in the network is provided. The communication device comprises: a processor; a memory device; a communication module for processing communications between the communication device and the network; an administration module providing instructions stored in the memory device. The instructions are operable on the processor to evaluate conditions for the communication device and the network to: generate and send administrative communications to the network as a current administrator for the network; detect a trigger condition to identify a replacement administrator for the network; and upon detecting the trigger condition, receive communications from the other communication devices that indicate intents of the other communication devices to be the replacement administrator for the network and identify a replacement administrator from the other communication devices from the intents of the other communication devices.

In the communication device, the network may be an 802.11 P2P class network; the communication device may be a current access point for the network; and the intents of the other communication devices may be provided in intent fields in frames transmitted by the other communication devices to the network.

In the communication device, the administrator module may change an intent value of the communication device to a lower level to lessen likelihood that the communication device will be identified as the replacement administrator.

In the communication device, the administrator module may send network configuration data for the network to the replacement administrator identified from the other communication devices.

In the communication device, upon detection of the trigger condition the administrator module may execute at least one of the following functions: stop sending beacon frames to the network to force the other communication devices to cease network activities; send a broadcast or unicast frames to the other communication devices indicating that the communication device wishes to initiate a group owner negotiation; and/or select a device from the other communication devices and sends a frame to initiate a group ownership transition to the device.

In the communication device, wherein upon detection of the trigger condition, the administrator module may generate and send a broadcast frame to the network having a field containing data for the trigger condition.

In the communication device, the field in the broadcast frame may contain a timer value that indicates when the replacement administrator is to be sought for the network.

In other aspects, various combinations of sets and subsets of the above aspects are provided.

Now, further details are provided on an embodiment and its network management features. The network may be wired or wireless. An exemplary wired network has a hub (such as a wired access point) that manages connections for wired and wireless devices. An exemplary wireless network has a wireless transceiver communicating with wireless devices. The transceiver generates through its antenna a transmission area for sending and receiving wireless transmissions. Devices enter the transmission area and communicate with the transceiver. Communications are generally sent from one device to the transceiver and then the transceiver then sends the communication to the intended second device. Communications with other devices in other networks are channeled through the transceiver, which has connections to other transceivers and other servers in the other networks. In certain networks, communications may be sent directly between devices in the area.

For example, in a mobile hotspot Wi-Fi network, a mobile server (functioning as an access point ("AP") or hotspot) manages communications among clients in the network. For an embodiment, the AP is selected for the network through a selection algorithm, which may have some intelligence (e.g. a selection algorithm that identifies a client as the AP after assessing parameters of a set of the clients in the network) or less intelligence (e.g. a simple first-identified, first selected algorithm). An embodiment identifies which a client in a network is to become the AP for the network. Once the AP is identified and selected, the AP manages communications and/or administrative functions for the network. Exemplary responsibilities of an AP include management of network settings and access parameters for devices in the network; administrative management for access parameters, including password and user identification (user IDs); managing any connections to additional networks; bridging traffic to other networks, bridging traffic between connected devices; and distributing group addressed traffic (also known as broadcast/multicast traffic).

An embodiment provides any one or more of four features that may operate independently of each other or in conjunction with one or more of the other features. First, an embodiment provides processes for identifying an AP for a network. Second, an embodiment provides processes for monitoring the status of the AP. Third, an embodiment provides processes for determining when and if it is deemed necessary to identify a replacement AP for the network. Fourth, an embodiment provides processes for transitioning control of the network from a current AP to a newly determined AP. Other features may be provided relating to identifying a replacement AP and how to re-establish or establish a network with the replacement AP.

In one configuration for a network, a selected AP and the other devices have a "server/client" relationship, where the AP is the "server" device for the network and the wireless devices are the "clients". In some networks, the server may be a fixed device, such as a wireless router directly connected to a physical wired Ethernet port in a network. The server operates as a node for the network and channels communications from the client devices intended for other devices in the network through the server device, acting as a node. Other networks may have a non-fixed server, such as another wireless device. For the purposes of convenience, and not limitation, the term "fixed" is used herein to describe a device that typically is not mobile, typically has a physical connection to its network (e.g. through an Ethernet port) and typically is powered by a power connection to a utility network (through a power cord). The term "non-fixed" is used herein to describe a device that typically is mobile, typically makes a wireless connection to its network and other devices and typically is powered by a self contained power source (e.g. through a battery). Any or all of such noted characteristics are not necessarily present for any fixed or non-fixed device. The phrase "server/clients" refers generally to devices that are related in some hierarchical network manner. Other phrases may be used to describe comparable device relationships for an embodiment, such as "master/slave", "network node/client", "access point/clients", "administrator/clients", "group owner/group members" etc. For the purposes of convention, and not limitation, the terms "access point", "AP", "administrator" or "group owner" is used herein to mean any device that performs in whole or in part network management functions for devices in a network where the access point/AP/administrator/group owner is a member. As such, any device deemed to be an access point/AP/administrator/group owner for its network performs at least some functions of a server for that network.

Features of an embodiment may be more relevant for a non-fixed server, but principles may be applied to a fixed server device. Features of an embodiment may be provided in a remote device, such as another server, that communicates with the servers and clients through the network.

Before discussing more details on specific features of an embodiment, a description is provided on a network having a device, as a server, that provides connections to other devices, as clients, according to an embodiment.

Figure 1B:
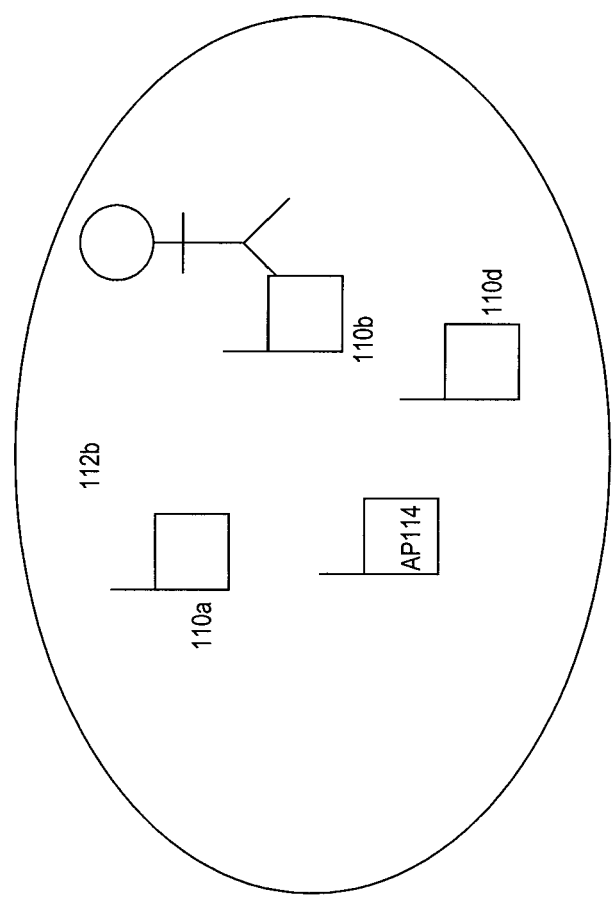
FIG. 1B is a schematic diagram of a 802.11 point to point (P2P) network in the wireless communication network of FIG. 1A having the wireless access point communicating with the wireless electronic communication device according to an embodiment.

To begin, details are provided on an exemplary network and devices in which an embodiment operates. Referring to FIGS. 1A and 1B, details on a system of exemplary networks and communication devices according to an embodiment are provided. FIG. 1A shows communication system 100 where network 102 provides access to a suite of applications, services and data to its connected devices 104 through its associated servers. Network 102 may be implemented in any known architecture, providing wired and/or wireless connections to its elements. It will be appreciated that in other embodiments, various networks and subnetworks as described herein may be incorporated into other networks.

Local area network (LAN) 106 is connected to network 102 and provides local wired and wireless connections to its devices 104 and 104b. Internet 118 may be connected to network 102.

A wireless network provides wireless communication coverage to devices that are located within the wireless transmission area of the WAN. In FIG. 1A, one exemplary wireless network is a Wide Area Network (WAN) 108. Devices 110 have wireless communication capabilities with one or more wireless networks (described later). WAN 108 may have multiple transmission areas by having multiple communication towers. A WAN network may be provided by a cellular communications company, such as Verizon (trade-mark).

Networks 112A and 112B are Wi-Fi networks that generally follow standards set by the IEEE LAN/MAN Standards Committee, known as IEEE 802, through its working group "11". The 802.11 standard defines media access control (MAC) and physical (PHY) layers in the OSI protocol model for WLAN. The family of 802.11 amendments is sometimes referred to as the 802.11x family. Currently, the 802.11 amendments encompass six wireless modulation techniques that all use the same communication protocol among their communicating elements. Other modulation techniques may be used. Current versions of 802.11 networks include: 802.11a, b, g and n, representing PHY amendments to IEEE 802.11. Specific transmission details and parameters of these networks and channels are known to those of skill in the art.

Wireless devices 110 communicate with each other through the data link layer in network 112A. In an exemplary environment, network 112A is a local, geographically small, wireless network. Wireless devices 110 include handheld devices, cell phones and computers (either desktop or portable) having a (wireless) network card, network adapter and/or network interface controller ("NIC") installed therein.

Network 112A includes access point (AP) 114 and supporting radio transmission equipment known to those skilled in the art. In network 112A, AP 114 is a communication device that contains an IEEE 802.11 radio receiver/transmitter (or transceiver) and functions as a bridge between network 112A and other networks (such as network 102, LAN 106 and/or network 108) for its carried communications. AP 114 provides data distribution services among devices 110 within network 112A and between devices 110 in network 112A and other devices in other connected networks. AP 114 may be a non-fixed wireless device, and as such AP 114 is effectively another wireless device 110. Functionalities for AP 114 may be provided in devices 110. For example, device 110c may have capabilities to be a Wi-Fi hotspot host and operate as AP 114c. As AP 114 is the data distribution point for network 112A, it will be seen that the transmission area is centered on AP 114. As AP 114 moves (as it is a non-fixed device), its transmission area for network 112A will move with it. Other APs may be used as bridges for other networks. It will be seen that an AP is one form of a server device and that devices 110 are one form of client devices for a network. Other devices may be provided in the client/server relationship.

For an 802.11 network, a "station" is a basic component in the network. A station is any device that implements the functionality of an 802.11 protocol and has a connection to a wireless local area network. Typically, the 802.11 connection and communication functions are implemented in hardware and software and may be provided in a network connection circuit or system in a NIC at the station. A station may be any device, including a laptop computer, device 104, wireless device 110, or an AP 114. Stations may be mobile, portable, or stationary. All stations support the 802.11 station services of authentication, de-authentication, privacy and data delivery. For the purposes of an embodiment as it relates to 802.11 standards, devices 110 may be considered to be stations.

A service set (SS) is defined as all devices (or stations) associated with a specific local or enterprise 802.11 wireless LAN(s). A service set identifier (SSID) is a unique 32-character network name, or identifier, that is created and associated with a particular WLAN 112. A basic service set (BSS) is defined a single access point with all its associated stations. An Extended Service Set (ESS) is a set of one or more interconnected basic service sets and associated local area networks.

An 802.11 network may be implemented in one of many network modes. An "ad hoc" 802.11 mode allows devices to operate in an independent basic service set (IBSS) network configuration. With an IBSS, there are no access points. Clients in a network communicate directly with each other in a peer-to-peer manner.

In a Wi-Fi network, communications between AP 114 and device 110 are encoded in frames of data transmissions. Frames have predetermined fields to identify the transmitting device and to provide information on different statuses of the device. Different types of frames are transmitted in different situations. Management frames are used to establish and maintain communications between AP 114 and device 110. Within management frames, authentication frames are used by device 110 to initiate a connection request. Other types of management frames may be used to transmit status and data between entities. Association frames allows AP 114 to allocate resources for and synchronize with device 110. Other classes of frames may also be used to transmit status and data between entities. Other messaging protocols outside of the Wi-Fi standard protocols may also be used.

An 802.11 network may also be implemented following the Wi-Fi Alliance's Peer-to-Peer (P2P) Technical Specification, as defined by the Wi-Fi Alliance Technical Committee P2P Task Group. In an exemplary P2P group, a set of P2P devices communicate with each other. A P2P device may function as a P2P group owner (namely as an administrator) and/or a P2P client; may conduct negotiations to assume a P2P group owner role or P2P client role; may provide network configuration (such as Wi-Fi Simple Configuration or WSC) and network discovery operations; and may support WLAN and P2P concurrent operations. A P2P group owner may provide "AP-like" roles of BSS functionality and services for associated clients in the network (for example P2P clients or legacy clients); may provide network configuration registrar functionality; may provide communication with associated clients; and may provide access to a simultaneous WLAN connection for its associated clients. A P2P client may implement non-AP STA functionality; and may provide WSC enrollee functionality. A P2P device may be configured to provide communications to other P2P devices in a P2P group and to also concurrently operate with a WLAN.

As an example, referring to FIG. 1B, network 112B is a Wi-Fi P2P network as part of system 100 (FIG. 1A). Network 112B is referred to herein as a P2P group and comprises AP 114 and devices 110a, 110b and 110d. It may be seen that network 112B may co-exist with network 112A and other networks in system 110 (as shown in FIG. 1A).

While features of an embodiment may be implemented for any network, features relating to an embodiment for a P2P group are described herein. As such, further detail is provided on AP 114 in network 112B. FIG. 2 provides general features of AP 114 (and/or device 110) in accordance with an embodiment of the disclosure. In the P2P group, for the purposes of illustration, AP 114 is assuming the P2P group owner role for network 112B. For the sake of simplicity the term AP will be understood to be interchangeable with the term server, P2P group owner or other devices that control operation of a network with clients.

In the present embodiment, AP 114 is based on a computing platform having functionality of an enhanced personal digital assistant with cellphone and e-mail features. AP 114 is a processor-controlled device (not shown). Software applications operating on AP 114 control its operations and network connections to implement the above-noted three features. Further detail on selected applications for an embodiment is provided later. It is understood that AP 114 may be based on construction design and functionality of other electronic devices, such as smart telephones, desktop computers, pagers or laptops having telephony equipment. In a present embodiment, AP 114 includes a housing 200, an LCD 202, speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. ESC key 210 may be inwardly depressed along the path of arrow "A" as a means to provide additional input to AP 114. It will be understood that housing 200 may be made from any suitable material as will occur to those of skill in the art and may be suitably formed to house and hold all components of AP 114.

AP 114 is operable to conduct wireless telephone calls, using any wireless phone system. Exemplary technologies are any known wireless phone systems such as a Mobitex (trade-mark) network, a DataTAC (trade-mark) network, a General Packet Radio Service (GPRS) network and also a variety of voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, etc. Other wireless phone systems that AP 114 may support may include Wireless WAN (IMS), Wireless MAN (Wi-Max or IEEE 802.16), Wireless LAN (IEEE 802.11), Wireless PAN (IEEE 802.15 and Bluetooth), high-speed data packet access (HSDPA) networks, Evolved High Speed Packet Access (HSPA+) networks, etc. and any others that support voice. Additionally, a Bluetooth network may be supported. Other embodiments include Voice over IP (VoIP) type streaming data communications that may simulate circuit-switched phone calls. AP 114 may have capabilities of communicating with other devices using other communication technologies, including instant messaging (IM) systems, text messaging (TM) systems and short message service (SMS) systems. Ear bud 214 may be used to listen to phone calls and other sound messages and microphone 216 may be used to speak into and input sound messages to AP 114.

AP 114 may operate as a dual-mode modem. Its mobile data communication functions allow it to make WAN connections and allow it to deliver voice and e-mails to user of AP 114. Its Wi-Fi connections (acting as a server) enable delivery of data to other devices 110 (e.g. a remote wireless device) concurrently and/or simultaneously. As noted earlier, AP 114 may provide communications to other P2P devices in a P2P group in network 112B (FIG. 1B) and to also concurrently operate with a WLAN network 108 and Wi-Fi network 112A (FIG. 1A). Since wireless AP 114 is portable, it may move. As such, its wireless coverage for area 112 and devices 110 are dynamic, with the quality of signals provided for an area ranging from non-existent, to poor, to adequate, to good and to excellent (with values in-between). As such, overall throughput between wireless AP 114 and device 110 may depend on an instantaneous wireless signal quality of two PHY layers, namely a Physical Coding Sublayer (PCS) and a Physical Medium Dependent (PMD) layer. The PCS encodes and decodes the data that is transmitted and received.

AP 114 may have modules to provide near field communication (NFC), allowing two devices to communicate wirelessly to each other when they are placed in very close proximity to each other. NFC technologies are an extension of the ISO 14443 proximity-card standard as a contactless card, Radio Frequency Identification (RFID) standard that incorporates the interface of a smart card and a reader into one device. A NFC-enabled device, such as device 110, typically includes an NFC integrated circuit (IC) that communicates to such devices as existing ISO 14443 smart cards and readers and other NFC devices and compatible with any existing contactless infrastructure. The NFC ICs may magnetic field induction where two loop antennas are located near each other and form an air-core transformer. The NFC technology operates on an unlicensed radio frequency ISM band of about 13.56 MHz and has a bandwidth of about 2 MHz. The working distance for the two devices is usually about between 0 and 20 centimeters. In use, a user of a first NFC device brings it close to another NFC enabled device or tag to initiate NFC communication. NFC data rates range from about 106 to 424 kbit/s.

With some of the components of AP 114 and devices 110 described, further detail is provided on establishing how devices 110 establish a network and determine which device becomes an administrator for the network.

Generally, in establishing and maintaining a network, devices that are initially searching for a network are placed in, and transit between, various states as they communicate with other devices as characteristics of the devices and network are established and communicated in the network. In establishing a network the devices generally operate through a series of phases, including: an initial contact phase where devices broadcast messages to see what other devices are in communication range that may be available to form a network; a network formation phase where the network is defined using information provided by the devices; an administrator negotiation phase where devices in the network determine which device will be designated as the administrator for the network; a network maintenance phase where updates are made as devices enter and leave the network; and a network disband phase, when the network is disbanded. Operation in a phase and transitioning between phases in controlled in whole or in part by modules operating on the devices (described in more detail later). At a given instance after an administrator is identified, another device may be identified as a subsequent administrator to replace and/or overtake group and network management duties of the current administrator.

For a particular embodiment, features to establish a network and identify an administrator are provided for establishing a P2P group (such as for network 112B, FIG. 1B) and establishing an administrator (namely, a group owner) for the group.

Some processes involved in establishing and maintaining a P2P group are provided as they provide additional context to features of an embodiment.

To establish a P2P group, a first process is for potential P2P devices to discover other devices and form connection(s) among them. In a P2P group a series of one-to-multiple-device links are established when the group has three (3) or more members. When the group has only two members, one-to-one links between the two devices are established. For the P2P group, one device must assume ownership of the connection(s). For the P2P group, discovery of devices is conducted in two phases: a device discovery phase, which facilitates two P2P devices arriving on a common channel in exchanging device information; and a service discovery phase, which allows a P2P device to discover available higher-layer services prior to forming a connection.

In the P2P device discovery phase, a device attempts to find and identify P2P devices so that the device may attempt to make connections to establish the group. In this phase, the device generates and exchanges Probe Request and Probe Response frames with other devices to exchange device information. Devices in a P2P group are discovered via a Probe Response frame sent from the P2P group owner. A P2P device that is not in a P2P group may enter a listen state to allow it to become discoverable to a P2P group. In the listen state, the P2P device monitors communications on a given communication channel in the 802.11 network.

In the discovery phase, a device may enter a scan phase for a P2P group, where the device collects information about surrounding devices or networks by scanning all supported channels. A P2P device may simultaneously scan for P2P groups and legacy networks (i.e. 802.11 infrastructure networks). An exemplary protocol that may be used for the scan phase is defined in IEEE Standard 802.11-2007. In the scan phase, a device may discover a P2P group owner by analyzing contents of received beacon frames or probe response frames. The device may also discover other P2P devices that are associated to that P2P group owner from group information advertisement frames.

After a device finds a P2P group, the device may then evaluate characteristics of the group to determine whether it wishes to request to join the group. Parameters and qualities of the group and its members are provided in data fields in frames received by the device. Some fields include: the P2P group limit field indicating how many connections are supported by the group; and the Intra-BSS distribution field indicating whether communications between P2P devices is supported.

After the discovery process is complete, group(s) may be formed among the discovered devices through a group formation process, which determines a P2P group owner from the devices and initiates formation of the related new group. In the group formation process, invitations are sent, typically by the deemed group owner, to other perspective and existing members of the group to join the group. A group may be persistent, where its network properties are maintained even during transitions or a group may be temporary, where its network properties are not maintained when there is a notable change in the network. A group may be autonomous, where a device starts a group where the device asserts group ownership prior to negotiating with peers to elect a group owner.

Group formation involves group owner negotiations and group provisioning through group owner negotiations. A device may initiate group owner negotiations by sending a group owner (GO) negotiation request frame to the other discovered devices. The GO negotiation request frame includes identification, status, intent and data fields for the device. The frame also includes a group capability bitmap field that indicates characteristics of the group to be formed if the device sending the GO negotiation request becomes the group owner for the network. A device that receives a GO negotiation request frame examines the received information and responds with a GO negotiation response frame. The device indicates its intent to continue with the group formation phase by populating a status of success field with a value indicating (by convention) the extent that the device wishes to participate in forming that group. The group formation process ends with transmission or reception of a GO negotiation response frame with the status code set to a value other than "success". A device may then either subsequently enter or continue a group formation process with other devices.

When a device receives a GO negotiation response frame with a status code indicating "success", a network may be established between at least those two devices. The receiving device examines the received information and responds with a GO negotiation confirmation frame containing a status attribute indicating whether the GO negotiation have succeeded or failed. Exemplary failure conditions include a lack of a commonly available channel and incompatible parameters related to settings for the group.

Once devices have exchanged response frames with a "success" indicator, by convention these devices have agreed to establish a network. The next process is to determine a group owner for the network. For one embodiment, this is done by analyzing the owner intent field provided by each device.

To determine a group owner, communicating devices exchange information through frames and determine among themselves which device is to be the group owner. In exchanged frames, data in an intent field provides an indication (as a scale) as to the level of interest of that device to be the group owner for the network. By convention, the device that has the highest value in its intent field (e.g., set to 15 on a scale of 0-15) is designated as the group owner. A tie breaker bit field in the exchanged frames provides an arbitration mechanism for devices having a same intent value. In other configurations, other fields and other indicators may be used to identify a group owner. For example, a "cross-connect"/gateway device may always sets its intent value high as a pre-determined indicator that it will be the group owner for the cross-connection.

Figure 3:
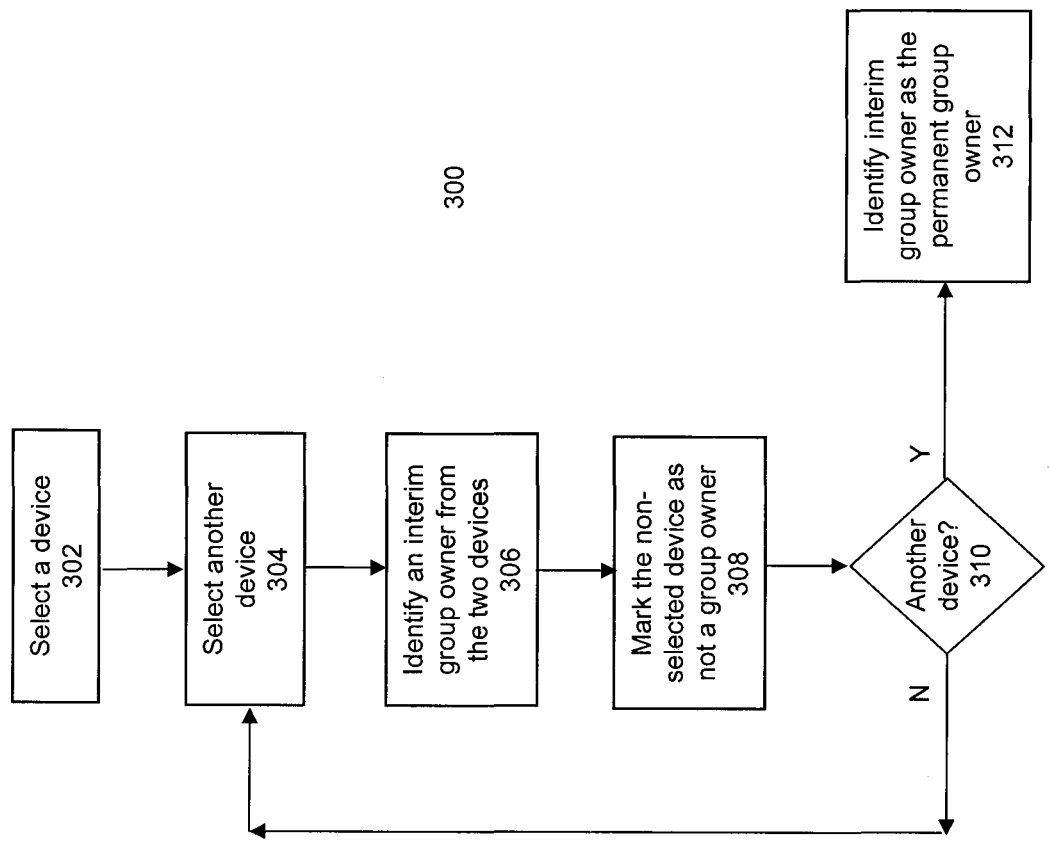
FIG. 3 is a flowchart of exemplary processes executed by devices in the P2P network of FIG. 1B in identifying a group owner for the P2P network according to an embodiment.

FIG. 3 shows process 300 where exemplary communications are provided by devices 110 and AP 114 in network 112B (FIG. 1B) to determine a group owner for network 112B. Note that AP 114 is the AP for network 112A, and it may or may not be designated to be the group owner for network 112B. It may assume both, either or neither role for networks 112A and 112B.

Process 300 starts at process 302 that selects a device from the discovered devices of network 112B. For the present example, the discovered devices include AP 114 and devices 110a, 110b and 110d. Any device may be selected. Next at process 304 a second device from the discovered devices of network 112B is selected. As such, two devices are selected. Next at process 306 an interim group owner for network 112B is identified from the two devices. The selection may be made from evaluating the intent fields of the two devices as noted earlier. Next at process 308 the device that was not selected as the interim group owner is marked as not being the group owner for network 112B. Next at process 310, a determination is made as to whether another device (not yet evaluated) is in network 112B. If there is an unevaluated device, the process returns to process 304. If there are no more unevaluated devices, the process progresses to process 312, where the last identified interim group owner is identified as the permanent group owner for network 112B. At that point, the permanent group owner is notified of its position and it may then initiate group management processes per normal P2P group protocols. It will be appreciated that other processes may be used to identify a group owner. Process 300 may be used when there is no external moderator for network 112B, which is typically the case. In another embodiment, the first two devices may negotiate group ownership and the deemed "interim group owner" may be responsible for inviting other devices to join the network.

The devices may set the values for their intent fields and the values of the fields may be updated depending on internal and external conditions to the devices. Additionally or alternatively, an external device may update or cause the devices to update the values of their intent fields.

For other networks, where a central moderator is provided, the devices may provide their intent values independently to the moderator and the moderator may select a group owner when all (or most) intent values are received. Having a group moderator may eliminate the looping characteristic of sequentially testing the intent value of each device per process 300 by a simultaneous testing of intent fields of three or more of the devices. Other algorithms may be provided to identify a group owner.

Once a P2P group is defined and the group owner is established, operation and management of the group may in one embodiment resemble infrastructure BSS operation as defined in IEEE Standard 802.11-2007 with the group owner assuming the role of the AP and the clients assuming the role of the stations.

The group owner may assign a globally unique P2P group identification (ID) for the group after it is formed. This group identification value may remain the same for the life of that group, thereby providing a unique identification code that may be used to distinguish itself from other groups.

As noted earlier, one type of P2P group is a persistent group. A persistent group has its network credentials, namely parameters for its network, locally stored with addresses of devices in the group. This storage enables the group owner to recreate the group for additional network sessions after formation of the group. Other devices in the group may also request that the group be restarted and use the stored credentials to join. Other devices in the group may request and/or be sent the credentials. If the credentials are intentionally or unintentionally deleted, then the group may lose its status as a "persistent" group.

Some details are provided on closing conditions for a P2P group. To execute an orderly shut-down of a group, the group owner sends notices to the connected devices of its intention to terminate the P2P group session. If the group owner departs from the group without notice or unexpectedly, the group is then terminated by default. A group owner may indicate its intent to terminate the group session using a deauthentication procedure, such as the procedure identified in section 11.3.1.3 of IEEE Standard 802.11-2007. If there are no connected members in a group, the group owner may end the session. For a persistent group, by convention, if the group owner deletes the credentials, the group is terminated.

With some features of network 112B (FIG. 1B) and a process to identify an initial group owner (FIG. 3) described, further detail is provided on network management processes provided by an embodiment. Specifically, features relating to processes to identify a subsequent group owner for network 112B are disclosed.

As noted earlier once a network is established with its administrator, an embodiment provides facilities to periodically and/or episodically designate a new device in the network as a replacement administrator. For a P2P group, a new group owner is identified to replace the current group owner.

For an embodiment, in operation of network 112B, the group owner provides typical P2P group management functions. For the sake of illustration, AP 114 is noted as the initial group owner for network 112B. The group owner functions require AP 114 to conduct additional network and device status checks and require AP 114 to generate and process network communications from members in network 112B. These operations are on top of ordinary functions that AP 114 provides for its user, such as providing voice and data communications for its user. The additional network overhead operations consume processing and communication bandwidth of AP 114 and cause corresponding additional power drain from the battery of AP 114. Meanwhile, other devices 110 in network 112B are not burdened by the network overhead functions provided by AP 114.

In view of the additional network overhead burdens carried by AP 114, an embodiment provides facilities to share and/or distribute network management functions among devices 110 and AP 114 for network 112B. This assists in lessening the processing and power drain imposed on AP 114. Other non-network functions provided by AP 114 may also be transferred and/or delegated to other devices in the group. In some cases, the P2P group may want to change group ownership to reduce network level communications in the group. For example, if network communications are mainly between two clients and neither is the group owner, then in a typical configuration, every frame be sent to the group owner (in an uplink) and then sent from the group owner to the target client (in a downlink). A more efficient configuration is to make either of the two clients as the group owner to eliminate the previous uplink/downlink communications involving the previous group owner.

As such, an embodiment provides facilities for network 112B that promote the transfer of some or all of the network management functions currently provided by a current AP 114 to one or more devices 110 in network 112B. A determination as to when to initiate transfer of the network functions to other devices (which are collectively referred to herein as "trigger conditions") may be performed after evaluating a combination of one or more conditions of: AP 114 (as the current group owner); other devices in network 112B (as the current potential replacement group owners); network 112B; and/or environment conditions around network 112B.

For the above noted determination, exemplary conditions for AP 114 include: an elapsed time that AP 114 has been the (current) group owner; amount of data traffic that AP 114 has managed during its time as group owner; battery capacity of AP 114; change in battery charge level of AP 114 during its time as group owner; transmission bandwidth capacity of AP 114, and others.

Exemplary conditions for potential replacement group owners (i.e. devices 110) include: an elapsed time since a device 110 (that is not the current group owner) has been the group owner of the network; an indication that device 110 has yet to be the group owner of the network; amount of data traffic that such a device 110 has sent during the time that AP 114 has been group owner; battery capacity of such a device 110; change in battery charge level of such a device 110 during the time that AP 114 has been group owner; transmission bandwidth capacity of such a device 110, and others.

Exemplary conditions for network 112B include: the number of devices in the network; the proximity of the network to additional networks; the total time of existence of the network; the time since a last group owner change for the network and others.

The trigger conditions may be monitored by each device and reported to a central site, such as the current AP or a central server. When a trigger condition has been identified, an embodiment then initiates processes on network 112B (and/or its devices) to cause a new group owner to be identified. Three exemplary processes to initiate determining a group owner are:

1) The current group owner is provided a signal to stop sending beacon frames to network 112B. This will eventually cause all connected devices to cease network activities and all the devices will revert to a device discovery and group owner negotiation phase;
2) The current group owner is provided with a signal to send a broadcast or unicast frame to all group members to indicate that it wants to initiate group owner negotiations; and/or
3) The current group owner may select a client in network 112B to be an "interim" or replacement group owner and transmit a frame to initiate a group owner transition to the selected client. The selected replacement group owner may then begin transmitting beacon frames with the same SSID following successful receipt of the frame and a time period (e.g. 200 ms), thereby effectively standing in the position of the previous group owner.

A combination of any of the above noted conditions may be used (with different weightings provided for the each condition) to determine when to initiate a determination of a replacement group owner. The weighting may be static or dynamically changed.

Once a trigger condition for initiating the determination of a replacement group owner has been detected and reported, each of the current group owner and potential group owners may initiate separate processes to manage identifying a new group owner. Each is discussed in turn.

Figure 4:
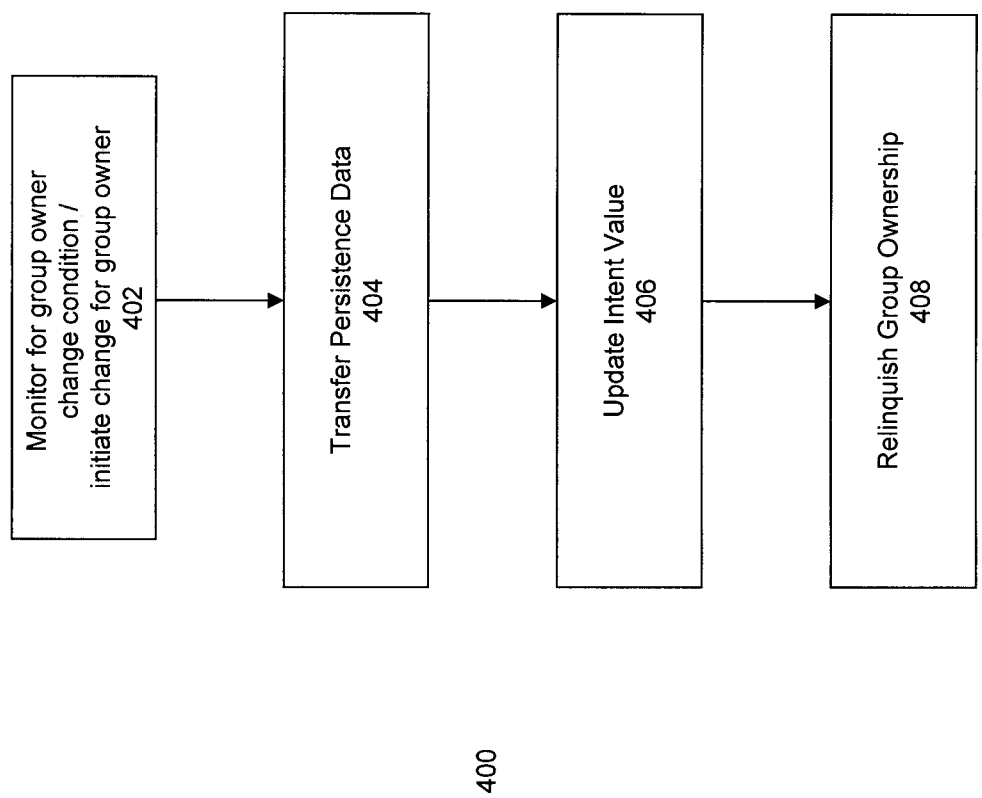
FIG. 4 is a flowchart of exemplary processes executed by the group owner in the P2P network of FIG. 1B in relinquishing its group ownership role according to an embodiment.

Referring to FIG. 4, for the current group owner (here AP 114), process 400 starts with process 402 where AP 114 monitors for a group ownership change condition. As noted above, the change condition may be activated by a combination of any number of conditions. The condition may have been triggered by AP 114 itself. For example, AP 114 may have a self-regulating countdown timer that triggers it to relinquish the group ownership upon expiry of the timer. The countdown event may also be set on a quantity of network messages processed, battery level, etc. of AP 114. The settings for the conditions may be defined when the network is established through frames. Alternatively or additionally, express signalling protocols may be established among the members of the group and the members may send various signals (as frames to each other to indicate triggering conditions and other status that may be used to indicate that a new group owner is desired (at least by one member of the group).

For example, a signalling protocol may be established and used to signal that a re-negotiation of group owner is desired (by at least one group member). The present Wi-Fi P2P signalling negotiation frame may be modified to be sent as a broadcast frame with a timer value that indicates when the replacement owner is to be sought for the network. The timer value may be a countdown timer or a target time.

Additionally or alternatively, as part of a modified negotiation frame protocol, the beacon frame may have or use a field indicating when and/or under what condition the group owner will cease to transmit beacons, indicating that a change in the group owner is to be initiated. When members of the group receive the beacon frames, they will have knowledge of conditions of when a replacement group owner should be identified for the group.

Additionally or alternatively, the current Wi-Fi P2P signalling negotiation frame may add or use a field that indicates a threshold providing a number of beacon intervals, for example, in the target beacon transmission time (TBTT) field, before the current group owner will cease to transmit beacons. As such, the field contains a count value that indicates a maximum number of beacon signals to be sent by the current group owner before a determination of a replacement group owner is to begin. When members of the group receive the beacon frames, they may maintain an internal count of the received beacon frames and will have knowledge of conditions when a new group owner may be identified for the group.

Once individual network members become aware of change conditions as provided by the group owner, one protocol is that the change is automatically initiated and the devices update their intent fields and a re-negotiation is started to determine the replacement group owner.

In another protocol, a confirmation may be required to be provided by one or more of the members to the network before the re-negotiations are initiated. For example, each device may independently monitor its current conditions to determine when and if it will initiate a change for the current AP 114. Protocols and thresholds may be set to determine how many devices need to receive the trigger condition to initiate a change. For example, in the simplest case, receipt of the broadcast frame with the indication by a single member in the group may be sufficient to trigger a re-negotiation. Alternatively, a threshold may be established, where two or more members must reply. Also, a weighing of the sender's priority and/or a voting mechanism among received frames from other members in the group may be used to determine when the trigger condition has been satisfied.

If the change condition was triggered by AP 114, then AP 114 may need to send appropriate notification frames to other devices in network 112B. Alternatively, the current group owner may simply initiate processes to reset its intent field and initiate communications to the other group members on the re-negotiations of the group owner when the current group owner detects or otherwise determines that the change condition has been satisfied (e.g. expiry of the timer and/or exceeding the beacon signal threshold, noted above). If the condition was triggered by another device 110 in network 112B, then AP 114 may need to wait for that device 110 to send appropriate notification frames to AP 114. Regardless, in process 402, once AP 114 determines that a change condition has been satisfied, AP 114 begins processes to maintain properties of network 112B (in whole or in part) and to relinquish group ownership to a replacement group owner in an orderly manner. As such, when the network management functions are transferred to the replacement AP, the replacement AP may utilize network configuration data for the network accessed by (the current) AP 114 to configure network 112B.

In process 404, if network 112B was established as a persistent network, then it may be useful for the replacement group owner to have access to the current network configurations. To the extent possible AP 114 retrieves the network configuration data and provides it to one or more devices in network 112B or to a central storage location that may be accessed by the other devices. The contents of the configuration data may be distributed in parts to any of the locations noted.

In process 406, AP 114 generally should not be selectable as the replacement group owner. As such, its intent value should be adjusted to a lower value than its current value to lessen a likelihood that AP 114 would be identified as the replacement group owner. The value may be set to a very low value in the scale (e.g. 0 or 1). The value may be adjusted according to conditions of AP 114, such as time that AP 114 has been the group owner; amount of data traffic that AP 114 has managed during its time as group owner; battery capacity of AP 114; change in battery charge level of AP 114 during its time as group owner; transmission bandwidth capacity of AP 114, and others. In certain circumstances, AP 114 may still be the best candidate for the replacement AP. As such, AP 114 may or may not change its intent value.

In process 408, to formally relinquish group ownership to network 112B, AP 114 may send a message frame to network 112 indicating that it is relinquishing the group ownership. The frame may include the updated value for the intent field and may include the persistence data for network 112B, so that other devices in network 112B may access same. In some embodiments, some of the network management functions may be relinquished and others may be retained. In relinquishing group ownership, a change in group ownership may be initiated as described above.

It will be appreciated that processes 404, 406 and 408 may be executed in different orders and at different times than provided in process 400.

Figure 5:
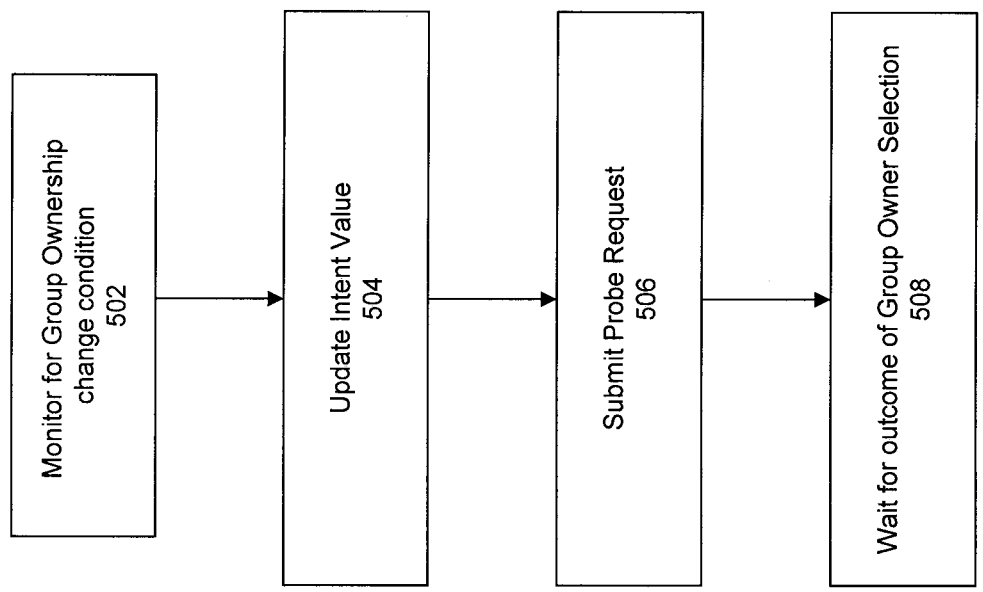
FIG. 5 is a flowchart of exemplary processes executed by the wireless communication device in the P2P network of FIG. 1B in submitting itself to be evaluated to be the group owner for the P2P network.

Next, for the potential replacement group owners in network 112B, FIG. 5 shows process 500 that may be executed in whole or in part by one or more of the potential replacement group owners when a replacement group owner is being determined. For the sake of example, process 500 described herein is shown to be executed on device 110a. It will be appreciated that comparable processes 500 may be executed in parallel on devices 110b and 110d.

For the potential replacement group owners, (here devices 110a, 110b and 110d), process 500 starts with process 502 where devices 110 monitor for a group ownership change condition. As noted above, the change condition may be initiated by a combination of any number of conditions. Detection of the condition may have been triggered by device 110a itself or from other devices. For example, device 110a may have a self-regulating countdown timer that triggers it to request a determination of a new group owner upon expiry of the timer. The countdown event may also be set on a quantity of network messages processed, battery level, etc. of device 110a. If the change condition was triggered by another device in network 112B (e.g. device 110b, device 110d, AP 114), then device 110a may need to wait for the other device to send appropriate notification frames to device 110a. Regardless, in process 502, once device 110a realizes that a change condition has been satisfied, device 110a begins processes to submit its qualifications to be the replacement group owner for network 112B.

In process 504, device 110a may wish to adjust the value of its intent field to a different value (higher or lower) than its current value to reflect its current level of interest to be designated as the replacement group owner. The value may be adjusted according to conditions of device 110a, such as time since device 110a was last the group owner; amount of data traffic that device 110a has managed during lately; battery capacity of device 110a; transmission bandwidth capacity of device 110a and others.

In process 506, to formally request consideration for group ownership to network 112B, device 110a may send a message frame to network 112 indicating that it is requesting consideration to be the group owner. The frame may include the updated value for the intent field and may include the persistence data for network 112B, so that other devices in network 112B may access same.

In process 508, once the request is sent, device 110a may wait to receive a decision from other devices as to the identification of the replacement group owner. Device 110a may perform other operations in the meantime.

It will be appreciated that processes 504, 506 and 508 may be executed in different orders and at different times than provided in process 500.

For both processes 400 and 500, the processes have assumed that the current network P2P configurations may be maintained. In other embodiments, the current P2P network may simply be torn down and a new network negotiation may be started, with the current group owner preferably adjusting its intent value to a lower level. The intent values of the other devices may be adjusted/increased as well. As such, when network management functions are transferred to the replacement AP, an embodiment may alternatively establish a replacement network for the network with the replacement AP providing administrative functions for the replacement network. The replacement network may utilize network configuration data for the network accessed by the current AP to configure the replacement network.

As noted above, the terms group owner, AP, group administrator, network administrator are used interchangeably herein unless specifically noted.

With aspects of main features of an embodiment described, further detail is now provided on internal components in AP 114 (as a group owner of network 112B and as a potential replacement group owner for network 112B).

It will be appreciated that features of group ownership negotiations and group management have been described in the context of the 802.11 P2P parameters of its Technical Specification. In other embodiments, non-compliant features to the Technical Specification may be provided. Some are discussed in turn.

First, an alternative embodiment may designate or have access to a central server for a network that acts as a repository for network data and/or a "master" administrator for a network. In such a system, devices in the network may send their intent values to the master administrator and the master administrator may then identify the group owner for the network. Any network configuration data stored by the group owner (e.g. the persistence data), may be stored by the master administrator. As such, when a change is made to the group owner, the replacement group owner may establish (or re-establish) a network by requesting the persistence data from the master administrator. The master administrator may also govern when to initiate a change in the group owner. The master administrator may be another device (not shown) in system 100 (FIG. 1A) that is accessible by the devices in the group. In this embodiment, the master administrator may send messages to the current group owner to trigger a group owner re-negotiation; additionally previously described triggering mechanisms may be used to initiate a group owner negotiation process. Alternatively, the master administrator may simply identify and assign a new group owner based on its analysis.

Figure 6:
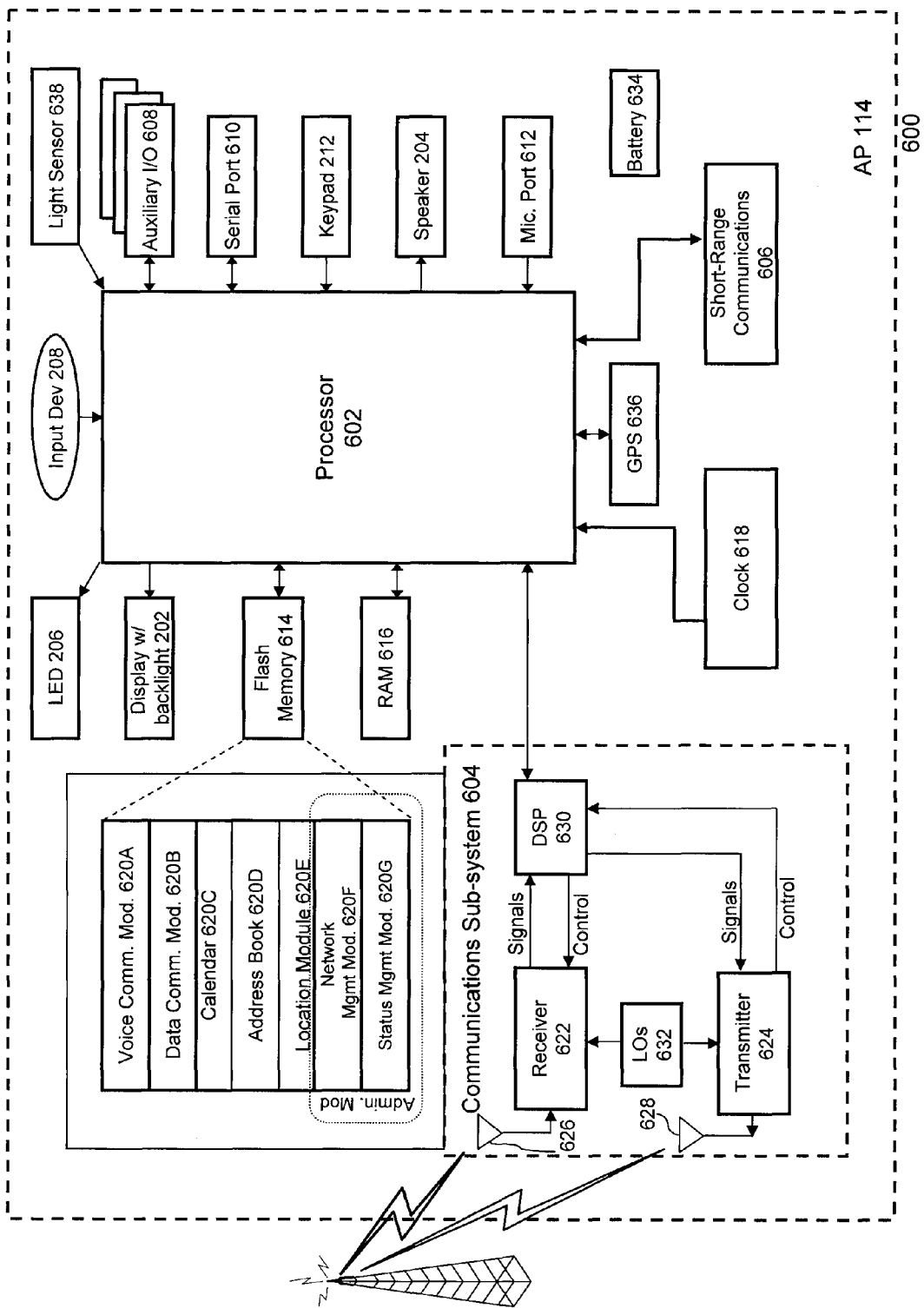
FIG. 6 is a block diagram of internal components of the wireless access point device of FIG. 1B.

With features of various embodiments described, referring to FIG. 6, functional components of AP 114 are provided in schematic 600. The functional components are generally electronic, structural or electro-mechanical devices. In particular, processor 602 is provided to control and receive almost all data, transmissions, inputs and outputs related to AP 114. Processor 602 is shown schematically as coupled to keypad 212 and other internal devices. Processor 602 preferably controls the overall operation of AP 114 and its components. Exemplary processors for processor 602 include processors in the Data 950 (trade-mark) series, the 6200 series and the PXA900 series, all available at one time from Intel Corporation. Processor 602 is connected to other elements in AP 114 through a series of electrical connections to its various input and output pins. Processor 602 has an IRQ input line which allows it to receive signals from various devices and modules. Appropriate interrupt firmware is provided which receives and reacts to the signals detected on the IRQ line. An interrupt signal may be used to indicate a request to terminate the segmented scanning mode of an embodiment.

In addition to processor 602, other internal devices of AP 114 are shown schematically in FIG. 6. These include: display 202; speaker 204; keypad 212; communication sub-system 604; short-range communication sub-system 606; auxiliary I/O devices 608; serial port 610; microphone port 612 for microphone 216; flash memory 614 (which provides persistent storage of data); random access memory (RAM) 616; clock 618 and other device sub-systems (not shown). AP 114 is preferably a two-way radio frequency (RF) communication device having voice and data communication capabilities. In addition, AP 114 preferably has the capability to communicate with other computer systems via the Internet.

Operating system software executed by processor 602 is preferably stored in a computer-readable medium, such as flash memory 614, but may be stored in other types of memory devices, such as read-only memory (ROM) or similar storage element. In addition, system software, specific device applications, or parts thereof, may be temporarily loaded into a volatile store, such as RAM 616. Communication signals received by the mobile device may also be stored to RAM 616.

In addition to an operating system operating on AP 114, additional software modules 620 enable execution of software applications on AP 114. A set of software (or firmware) applications, generally identified as applications 620, that control basic device operations, such as voice communication module 620A and data communication module 620B, may be installed on AP 114 during manufacture or downloaded thereafter. As well, other software modules are provided, such as calendar module 620C, address book 620D and location module 620E.

Messages received and/or generated by any module 620 may be processed by data communications module 620B. Messages may be transmitted/received in network layer communications, emails, and/or other messaging systems to network 112A/B and/or devices 110. Module 620B receives messages from external devices 110, extracts relevant information from them and provides the information to relevant modules. Module 620B notifications from modules 620, extracts relevant information from them and generates and sends messages containing relevant information to the messages to network 112, including to devices 110. Messages relating to network 112 for device 110, when operating as an AP are processed separately by the modules from other non-network 112 communications (e.g. cellular communications) processed by device 110.

Network management module (NMM) 620F is software and/or firmware that processes network functions for network 112A/B for AP 114. This includes monitoring the status of AP 114 and managing incoming and outgoing network management communications. When AP 114 is a group owner for network 112B, NMM 620F implements process 400 (FIG. 4). When AP 114 is a potential group owner for network 112B, NMM 620F implements process 500 (FIG. 5). Communications and data are streamed through either communication module 504 or 606. NMM 620F may also receive signals from other modules providing information to it on other modules that are using communication module 604 or 606. Any access parameter that is set by an embodiment is evaluated by NMM 620F. Data relating to the access parameters provided by data from AP 114, network 110 and/or device 112. Processes to evaluate and authenticate connection requests from devices 112 may be provided in NMM 620F.

Status Management Module (SMM) 620G is software and/or firmware that monitors network conditions and local operating conditions of AP 114. Depending on the values of those conditions, SMM 620G may cause an update to the intent value used by AP 114 when communicating frames to other devices in network 112B (as described above). Also, on certain internal and/or external trigger conditions, SMM 620G may determine that AP 114 should absolutely be made the replacement group owner. In such circumstances, SMM 620G may update the status of the intent field of AP 114 to place it at the highest intent value and may also have AP 114 send one or more messages (either as point-to-point messages or as a broadcast message) to other devices requesting that those devices decrease their intent value and/or not decline being a group owner for the next group owner negotiations. Further still, SMM 620G may also have AP 114 send one or more messages that cause group owner negotiations to begin immediately. SMM 620G may implement the processes relating to triggering network and device changes as provided in processes 400 and 500 (FIGS. 4 and 5).

NMM 620F and SMM 620G individually and collectively provide administrative functions for AP 114 in managing its connections to its network and managing its network administrative functions, when AP 114 is the administrator/group owner for the network. NMM 620F and SMM 620F may be each considered to be (in whole or in part) an administrative module providing instructions to processor 602.

Additional modules such as personal information manager (PIM) application may be provided. Any module may be installed during manufacture or downloaded thereafter into AP 114.

Data associated with each application, the status of one or more networks, profiles for networks and trigger conditions for commands for networks may be stored and updated in flash memory 614.

Communication functions, including data and voice communications, are performed through the communication sub-system 604 and the short-range communication sub-system 506. Collectively, sub-systems 604 and 606 provide the signal-level interface for all communication technologies processed by AP 114. Various applications 620 provide the operational controls to further process and log the communications. Communication sub-system 604 includes receiver 622, transmitter 624 and one or more antennas, illustrated as receive antenna 626 and transmit antenna 628. In addition, communication sub-system 604 also includes processing modules, such as digital signal processor (DSP) 630 and local oscillators (LOs) 632. The specific design and implementation of communication sub-system 604 is dependent upon the communication network in which AP 114 is intended to operate. For example, communication sub-system 604 of AP 114 may on network technologies described earlier (e.g. NFC, GPRS, 802.11 networks, 802.11 P2P networks, Bluetooth networks, AMPS, TDMA, CDMA, CDMA 2000, PCS, GSM, WWAN, WMAN, WLAN, WPAN (Bluetooth), IM, TM, SMS, etc.).

Short-range communication sub-system 606 enables communication between AP 114 and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 506 may have one or more inputs or outputs to sub-system 604 in processing signals for its networks.

In addition to processing communication signals, DSP 630 provides control of receiver 626 and transmitter 624. For example, gains applied to communication signals in receiver 626 and transmitter 624 may be adaptively controlled through automatic gain-control algorithms implemented in DSP 630. One particular operational aspect of receiver 622 and antenna 626 is that they need to be tuned to receive signals in the 802.11 network bands, e.g. signals in the 2.4 GHz to 5.8 GHz range for sub-systems 606 and if needed, sub-system 604. Additional filters on antenna may also be used to provide such functionality.

Receiver 622 and antenna 626 provide at least some of the hardware and software elements needed to detect when AP 114 is in the presence of communication signals from networks 108 and 112A/B, thereby enabling AP 114 to communication with other devices in networks 108 and 112A/B.

Powering the entire electronics of the mobile handheld communication device is power source 634. In one embodiment, the power source 634 includes one or more batteries. In another embodiment, the power source 634 is a single battery pack, especially a rechargeable battery pack. A power switch (not shown) provides an "on/off" switch for AP 114. A power source interface (not shown) may be provided in hardware, firmware, software or a combination of such elements to selectively control access of components in AP 114 to power source 634. Upon activation of the power switch an application 620 is initiated to turn on device 110. Upon deactivation of the power switch, an application 620 is initiated to turn off device 110. Power to AP 114 may also be controlled by other devices and by software applications 620.

AP 114 may also have global positioning system (GPS) 636 to assist in identifying a present location of AP 114 and may also have light sensor 638 to provide data on the ambient light conditions for AP 114.

Although an embodiment has been described in terms of identifying/maintaining server/client device hierarchies in a wireless network, such as an 802.11 network, the features of an embodiment may be provided in coordinate aspects of different connections among different devices in different networks.

It will be appreciated that NMM 620F, SMM 620G and other modules in the embodiments may be implemented using known programming techniques, languages, processes and algorithms. Although the modules, processes and applications described are implemented in AP 114, it will be appreciated that some functions of the modules may be provided in a separate server that is in communication with AP 114 and/or devices 110. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on AP 114 may be executing concurrently with other modules. As such, any of modules 620 (or parts thereof) may be structured to operate in as a "background" application on AP 114, using programming techniques known in the art.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s). Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A communication device in a network for communicating with other communication devices in the network, the communication device comprising:
   a processor;
   a memory device;
   a communication module for processing communications between the communication device and the network; and an administration module providing instructions stored in the memory device, the instructions operable on the processor to evaluate conditions for the communication device and the network to
  generate and send administrative communications to the network as a current administrator for the network;
  detect a trigger condition to identify a replacement administrator for the network;
  upon detecting the trigger condition
    receive communications from the other communication devices that indicate intents of the other communication devices to be the replacement administrator for the network; and
    identify a replacement administrator from the other communication devices from the intents of the other communication devices and
  when the network management functions are transferred to the replacement administrator, establish a replacement network for the network with the replacement administrator providing administrative functions for the replacement network.

2. The communication device in a network for communicating with other communication devices in the network as claimed in claim 1, wherein:
  the network is an 802.11 peer-to-peer (P2P) class network;
  the communication device is a current access point for the network; and
  the intents of the other communication devices are provided in intent fields in frames transmitted by the other communication devices to the network.

3. The communication device in a network for communicating with other communication devices in the network as claimed in claim 2, wherein the administrator module:
  changes an intent value of the communication device to a lower level to lessen likelihood that the communication device will be identified as the replacement administrator.

4. The communication device in a network for communicating with other communication devices in the network as claimed in claim 3, wherein the administrator module:
  sends network configuration data for the network to the replacement administrator identified from the other communication devices.

5. The communication device in a network for communicating with other communication devices in the network as claimed in claim 3, wherein upon detection of the trigger condition, the administrator module executes at least one of the following functions:
  stop sending beacon frames to the network to force the other communication devices to cease network activities;
  send a broadcast or unicast frame to the other communication devices indicating that the communication device wishes to initiate a group owner negotiation; or
  select a device from the other communication devices and send a frame to initiate a group ownership transition to the device.

6. The communication device in a network for communicating with other communication devices in the network as claimed in claim 3, wherein upon detection of the trigger condition the administrator module generates and sends a broadcast frame to the network having a field containing data for the trigger condition.

7. The communication device in a network for communicating with other communication devices in the network as claimed in claim 6, wherein the field in the broadcast frame contains a timer value that indicates when the replacement administrator is to be sought for the network.

8. The communication device in a network for communicating with other communication devices in the network as claimed in claim 1, wherein:
  the trigger condition is any one or more of a battery level of the current administrator; an elapsed time since a second member in the network has been the current access point.

9. The communication device in a network for communicating with other communication devices in the network as claimed in claim 1, wherein the network administrator module further:
  when the network management functions are transferred to the replacement administrator, utilizes network configuration data for the network accessed by the current administrator to configure the network.

10. The communication device in a network for communicating with other communication devices in the network as claimed in claim 1, wherein the network administrator module further:
  when the network management functions are transferred to the replacement administrator, maintains the network with the replacement administrator providing administrative functions for the network.

11. The communication device in a network for communicating with other communication devices in the network as claimed in claim 1, wherein the network administrator module further:
  generates a broadcast frame that provides a field containing data for the trigger condition.

12. A communication device in a network for communicating with other communication devices in the network, the communication device comprising:
  a processor;
  a memory device;
  a communication module for processing communications between the communication device and the network; and
  an administration module providing instructions stored in the memory device, the instructions operable on the processor to evaluate conditions for the communication device and the network to
    track as a trigger condition to determine whether a replacement administrator for the network either a maximum number of beacon signals to be sent by the current administrator or expiry of a timer tracking when the replacement administrator is to be sought;
    after determining that the trigger condition has been satisfied
      receive communications from the other communication devices that indicate intents of the other communication devices to be the replacement administrator for the network; and
      identify a replacement administrator from the other communication devices from the intents of the other communication devices.

13. The communication device in a network for communicating with other communication devices in the network as claimed in claim 12, wherein:
  the communication device extracts the maximum number or a value for the timer from a field in the broadcast frame received by the communication device from the network.

14. The communication device in a network for communicating with other communication devices in the network as claimed in claim 12, wherein:

the replacement administrator utilizes network configuration data for the network accessed by the current administrator to configure a replacement network.

15. The communication device in a network for communicating with other communication devices in the network as claimed in claim 12, wherein:

the network is an 802.11 peer-to-peer (P2P) class network;

the communication device is a current access point for the network; and the intents of the other communication devices are provided in intent fields in frames transmitted by the other communication devices to the network.

16. The communication device in a network for communicating with other communication devices in the network as claimed in claim 12, wherein the administrator module:

changes an intent value of the communication device to a lower level to lessen likelihood that the communication device will be identified as the replacement administrator.

17. The communication device in a network for communicating with other communication devices in the network as claimed in claim 12, wherein the administrator module:

sends network configuration data for the network to the replacement administrator identified from the other communication devices.

18. The communication device in a network for communicating with other communication devices in the network as claimed in claim 12, wherein upon detection of the trigger condition, the administrator module executes at least one of the following functions:

stop sending beacon frames to the network to force the other communication devices to cease network activities;

send a broadcast or unicast frame to the other communication devices indicating that the communication device wishes to initiate a group owner negotiation; or select a device from the other communication devices and send a frame to initiate a group ownership transition to the device.

* * * * *